US008689271B2

(12) United States Patent
Cocchi et al.

(10) Patent No.: US 8,689,271 B2
(45) Date of Patent: Apr. 1, 2014

(54) INTERNET SERVICE PROVIDER CALLBACK FOR SATELLITE SYSTEMS

(75) Inventors: Ronald P. Cocchi, Seal Beach, CA (US); Donald J. Breier, Torrance, CA (US); Dennis R. Flaharty, Irvine, CA (US); Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 226 days.

(21) Appl. No.: 12/901,975

(22) Filed: Oct. 11, 2010

(65) Prior Publication Data

US 2011/0030023 A1 Feb. 3, 2011

Related U.S. Application Data

(63) Continuation of application No. 12/404,244, filed on Mar. 13, 2009, now abandoned, which is a continuation of application No. 09/783,241, filed on Feb. 14, 2001, now abandoned.

(51) Int. Cl.
*H04N 7/16* (2011.01)
*H04N 7/173* (2011.01)

(52) U.S. Cl.
USPC .................... 725/110; 725/2; 725/134

(58) Field of Classification Search
USPC .......................... 725/1, 2, 110, 134
See application file for complete search history.

(56) References Cited

U.S. PATENT DOCUMENTS

| | | | |
|---|---|---|---|
| 3,601,528 A | 8/1971 | McVoy | |
| 4,930,152 A | 5/1990 | Miller | |
| 5,157,716 A | 10/1992 | Naddor et al. | |
| 5,404,393 A * | 4/1995 | Remillard | 379/93.25 |
| 5,504,519 A * | 4/1996 | Remillard | 725/10 |
| 5,561,708 A * | 10/1996 | Remillard | 379/93.19 |
| 5,721,584 A | 2/1998 | Yoshinobu et al. | |
| 5,862,325 A * | 1/1999 | Reed et al. | 709/201 |
| 5,898,919 A | 4/1999 | Yuen | |
| 5,907,597 A | 5/1999 | Mark | |

(Continued)

FOREIGN PATENT DOCUMENTS

| | | |
|---|---|---|
| CA | 2085775 | 6/1994 |
| EP | 1143727 A1 | 10/2001 |

(Continued)

OTHER PUBLICATIONS

Liu; "Internet and Interactive Television: Competition or Cooperation?"; IEEE; Jun. 11, 1997; pp. 244-245.

(Continued)

*Primary Examiner* — James R Sheleheda

(57) ABSTRACT

A method, apparatus, article of manufacture, and a memory structure for delivering purchase information comprising storing purchase information for a purchase of a user in a set top box. The set top box (STB) is configured to receive and display the broadcast signals through a tuner onto a display device. The STB establishes a connection to the Internet through a user initiated action (e.g., when the user accesses the Internet using the STB). A new transmission control/ Internet protocol (TCP/IP) connection is obtained using the established user-initiated Internet connection without the user requesting the connection. A secure electronic connection is established with a server through the new TCP/IP connection. The purchase information is then transmitted from the STB through the secure electronic connection to the server.

11 Claims, 5 Drawing Sheets

(56) References Cited

U.S. PATENT DOCUMENTS

| | | | |
|---|---|---|---|
| 6,064,724 A * | 5/2000 | Kelly | 379/92.04 |
| 6,166,778 A | 12/2000 | Yamamoto et al. | |
| 6,169,734 B1 | 1/2001 | Wilson | |
| 6,192,045 B1 * | 2/2001 | Williams et al. | 370/352 |
| 6,345,288 B1 * | 2/2002 | Reed et al. | 709/201 |
| 6,396,531 B1 | 5/2002 | Gerszberg et al. | |
| 6,442,255 B1 * | 8/2002 | Pitsch et al. | 379/106.01 |
| 6,466,671 B1 | 10/2002 | Maillard et al. | |
| 6,538,996 B1 * | 3/2003 | West et al. | 370/238 |
| 6,546,091 B1 * | 4/2003 | Wehmeyer et al. | 379/93.29 |
| 6,622,307 B1 * | 9/2003 | Ho | 725/120 |
| 6,862,611 B1 | 3/2005 | Marics et al. | |
| 6,883,000 B1 * | 4/2005 | Gropper | 1/1 |
| 6,993,499 B2 | 1/2006 | Gagnon et al. | |
| 7,228,558 B1 * | 6/2007 | Lebouill | 725/86 |
| 7,552,069 B2 * | 6/2009 | Kepecs | 705/14.25 |
| 2001/0036254 A1 | 11/2001 | Davis et al. | |
| 2002/0040475 A1 | 4/2002 | Yap et al. | |
| 2002/0055847 A1 | 5/2002 | Nakano et al. | |
| 2002/0056118 A1 | 5/2002 | Hunter et al. | |
| 2002/0073085 A1 * | 6/2002 | O'Day et al. | 707/10 |
| 2002/0083456 A1 * | 6/2002 | Bates et al. | 725/60 |
| 2003/0023703 A1 | 1/2003 | Hayward et al. | |
| 2003/0120615 A1 | 6/2003 | Kuo | |
| 2003/0172124 A1 * | 9/2003 | Feinleib et al. | 709/217 |

FOREIGN PATENT DOCUMENTS

| | | |
|---|---|---|
| EP | 1233592 A2 | 8/2002 |
| GB | 2352928 | 2/2001 |
| JP | 63-280549 | 11/1988 |
| JP | 2-234555 | 9/1990 |
| JP | 8-046694 | 2/1996 |
| JP | 8-288920 | 11/1996 |
| JP | 2001-308910 | 11/2001 |
| WO | 94/28669 | 12/1994 |
| WO | 95/26092 | 9/1995 |
| WO | 96/41448 | 12/1996 |
| WO | 97/31479 | 8/1997 |
| WO | 00/43962 | 7/2000 |

OTHER PUBLICATIONS

Robin, Michael et al.; "Digital Television Fundamentals-Design and Installation of Video and Audio Systems"; McGraw-Hill; published 1998; Chapter 8, title page(s) and pp. 345-425.

* cited by examiner

US 8,689,271 B2

INTERNET SERVICE PROVIDER CALLBACK FOR SATELLITE SYSTEMS

CROSS-REFERENCE TO RELATED APPLICATIONS

This application is a continuation of and claims the benefit under 35 U.S.C. Section 120 of the following co-pending and commonly-assigned U.S. utility patent applications, which are incorporated by reference herein:

Utility application Ser. No. 12/404,244, filed Mar. 13, 2009, by Ronald P. Cocchi, Donald J. Breier, Dennis R. Flaharty, and Raynold M. Kahn, entitled "INTERNET SERVICE PROVIDER CALLBACK FOR SATELLITE SYSTEMS", which is a continuation of Utility application Ser. No. 09/783,241, filed Feb. 14, 2001, by Ronald P. Cocchi, Donald J. Breier, Dennis R. Flaharty, and Raynold M. Kahn, entitled "INTERNET SERVICE PROVIDER CALLBACK FOR SATELLITE SYSTEMS".

BACKGROUND OF THE INVENTION

1. Field of the Invention

The present invention relates to systems and methods for delivering information, and in particular to a system and method for delivering e-commerce and pay-TV programming purchase information from a set top box to a pay-TV service provider across the Internet.

2. Description of the Related Art

Television programs are distributed to viewers by a variety of broadcasting methods. These methods include traditional analog broadcast television (National Television Systems Committee or "NTSC" standard), the digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

To view a television program, a customer may have to subscribe to a service package offered by a pay-TV service/transmission provider (also referred to as a direct broadcast satellite (DBS) operator) such as a satellite transmitter (e.g., DIRECTV) or a cable company. Such a pay-TV service provider may require a user to utilize a set-top box (STB), receiver, or integrated receiver decoder (IRD) that enables the descrambling or decryption of the transmission. The set-top box may be configured to allow the viewing of one or more particular channels, programs, etc. based on a customer's payment or subscription. Accordingly, when a customer subscribes to a service package, the pay-TV service provider enables the set-top box to allow the customer to view the transmissions in the selected package.

Additionally, customers may desire to view a particular channel or program. To accommodate such customers, transmission providers may provide impulse pay-per-view (IPPV) programs or channels wherein a customer may pay for a particular channel or program. A customer may select a particular pay-per-view program or channel using a remote control that communicates with the set-top box. Once the pay-per-view program has been selected, information regarding the selected pay-per view program is stored by the set top box (e.g., in memory or a smart card) until the set top box transmits (in a callback transaction) the purchase information to the pay-TV service provider. Once the callback is initiated, the purchase information is transmitted through a modem attached to the set top box by dialing a costly toll free phone number direct to the pay-TV service provider's facility. Thus, the use of a toll free phone number is costly to a pay-TV service provider and requires extensive on-site infrastructure.

Additionally, subscriber renewal notices are used by a set top box. In the prior art, such renewal notices are broadcast by satellite and received in the set top box on a monthly basis. Accordingly, valuable satellite bandwidth is occupied every month for the subscriber renewal notices.

What is needed is a method for efficiently and automatically delivering purchase information relating to a pay per view program or e-commerce transaction without having to call a costly toll free phone number.

SUMMARY OF THE INVENTION

To address the requirements described above, the present invention discloses a method, apparatus, article of manufacture, and a memory structure for delivering electronic commerce (e-commerce) and impulse pay per view (IPPV) information from a satellite set top box (STB) to a pay-TV service provider such as a DBS operator facility using an Internet Service Provider (ISP), Internet, and Internet server or a data paging network. Purchase information is delivered from the STB that resides on the subscriber's premises to the satellite operator by means of a callback operation using a communication module (e.g., an onboard modem).

In one or more embodiments of the invention, the STB initiates the callback utilizing the telecommunications infrastructure of an ISP or data paging network to deliver the purchase information to a server at the pay-TV service provider's facility and also enables the receipt of pay-TV service provider facility data such as subscriber renewal notices. The server forwards the purchase information to a billing system where it may be processed and incorporated into a subscriber's bill.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Video Distribution System

Figure 1:
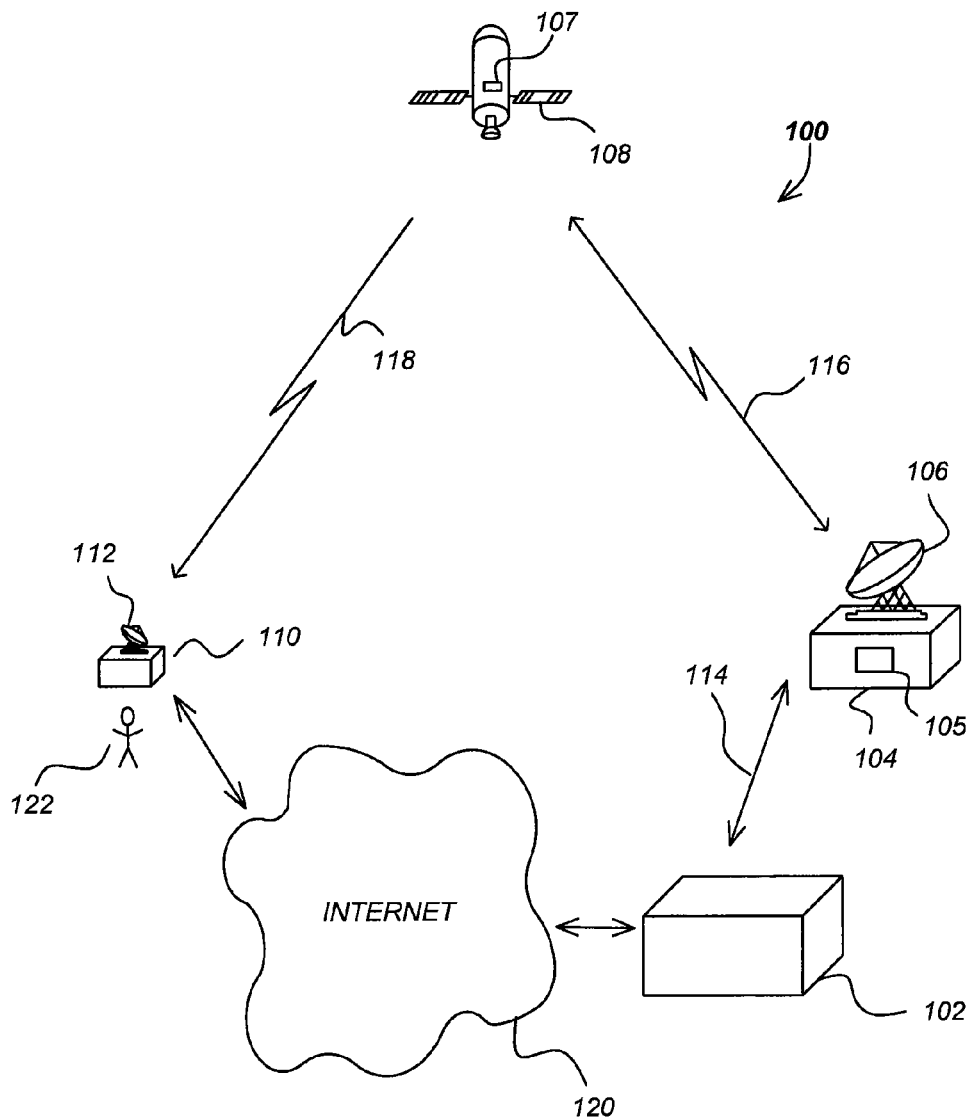
FIG. 1 is a diagram showing an overview of a video distribution system in accordance with one or more embodiments of the invention.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via the Internet 120, a public switched telephone network (PSTN), or other link. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB that is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting, cable, or other methods. Further, the different functions collectively allocated among the control center 102 and the uplink center 104 as described above can be reallocated as desired without departing from the intended scope of the present invention.

Although the foregoing has been described with respect to an embodiment in which the information delivered to the subscriber/customer 122 is video (and audio) material such as a movie, the foregoing method can be used to deliver program material comprising purely audio information or other data as well.

Uplink Configuration

Figure 2:
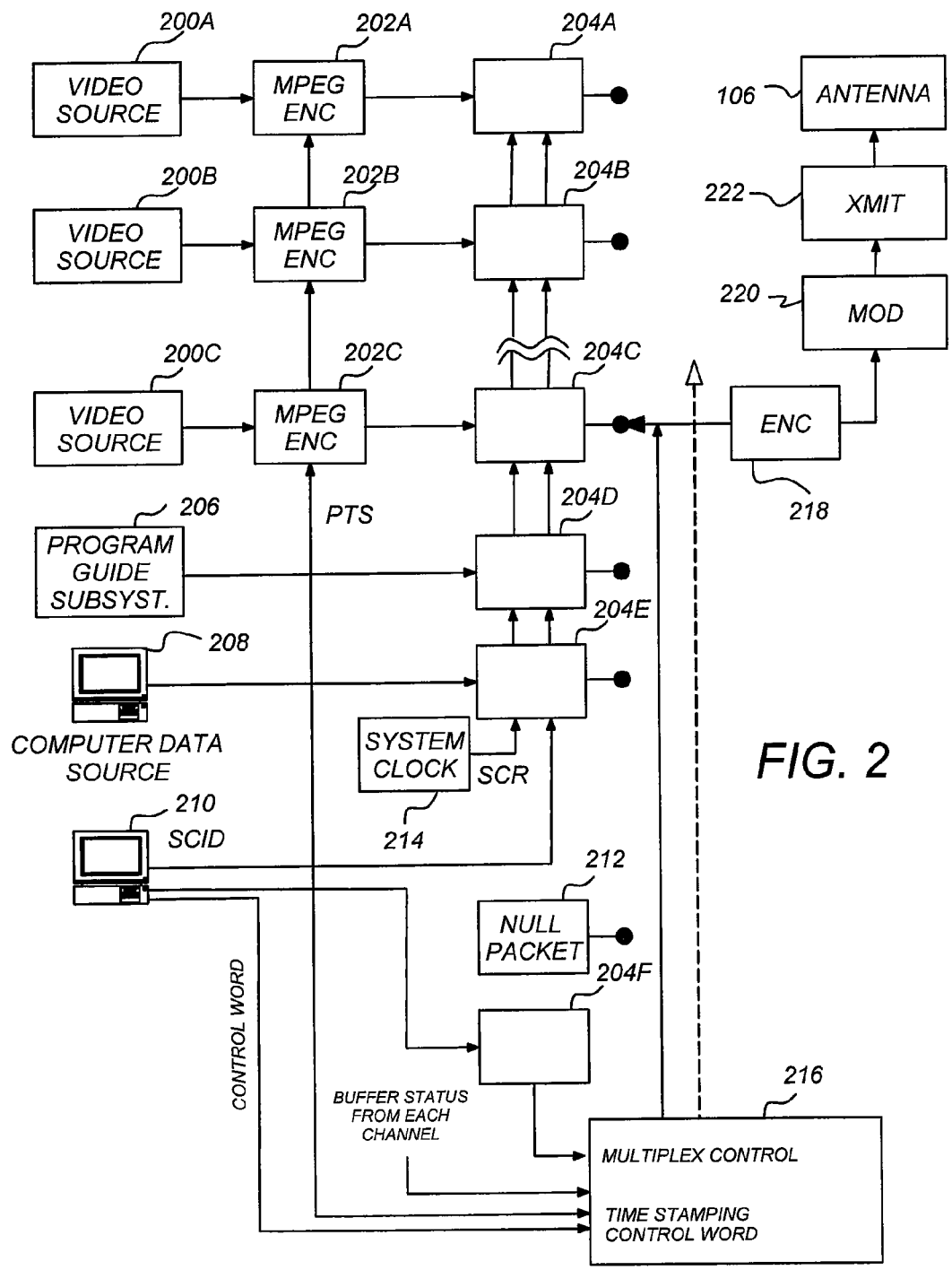
FIG. 2 is a block diagram showing a typical uplink configuration showing how video program material is uplinked to a satellite for transmission to subscribers using a single transponder in accordance with one or more embodiments of the invention.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the service channel identification (SCID) to the packetizers 204 for use in generating the data packets. These data packets (also referred to as signals) are then multiplexed into serial data and transmitted/broadcast.

Broadcast Data Stream Format and Protocol

Figure 3A:
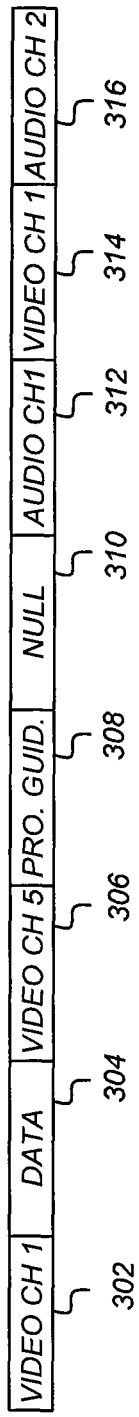
FIG. 3A is a diagram of a representative data stream received from a satellite in accordance with one or more embodiments of the invention.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite 108 via the antenna 106. The receiver receives these signals, and using the SCID, reassembles the packets to regenerate the program material for each of the channels.

Figure 3B:
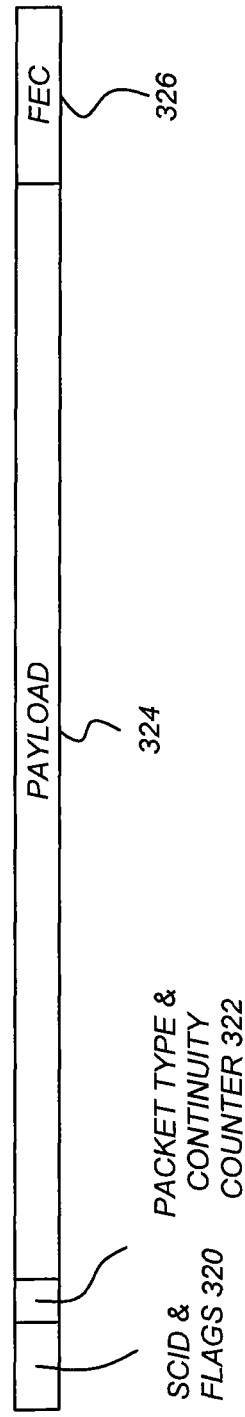
FIG. 3B is a diagram illustrating the structure of a data packet in accordance with one or more embodiments of the invention.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by a video program source. The final packet segment 326 is data required to perform forward error correction.

Receiver/Set Top Box

Figure 4:
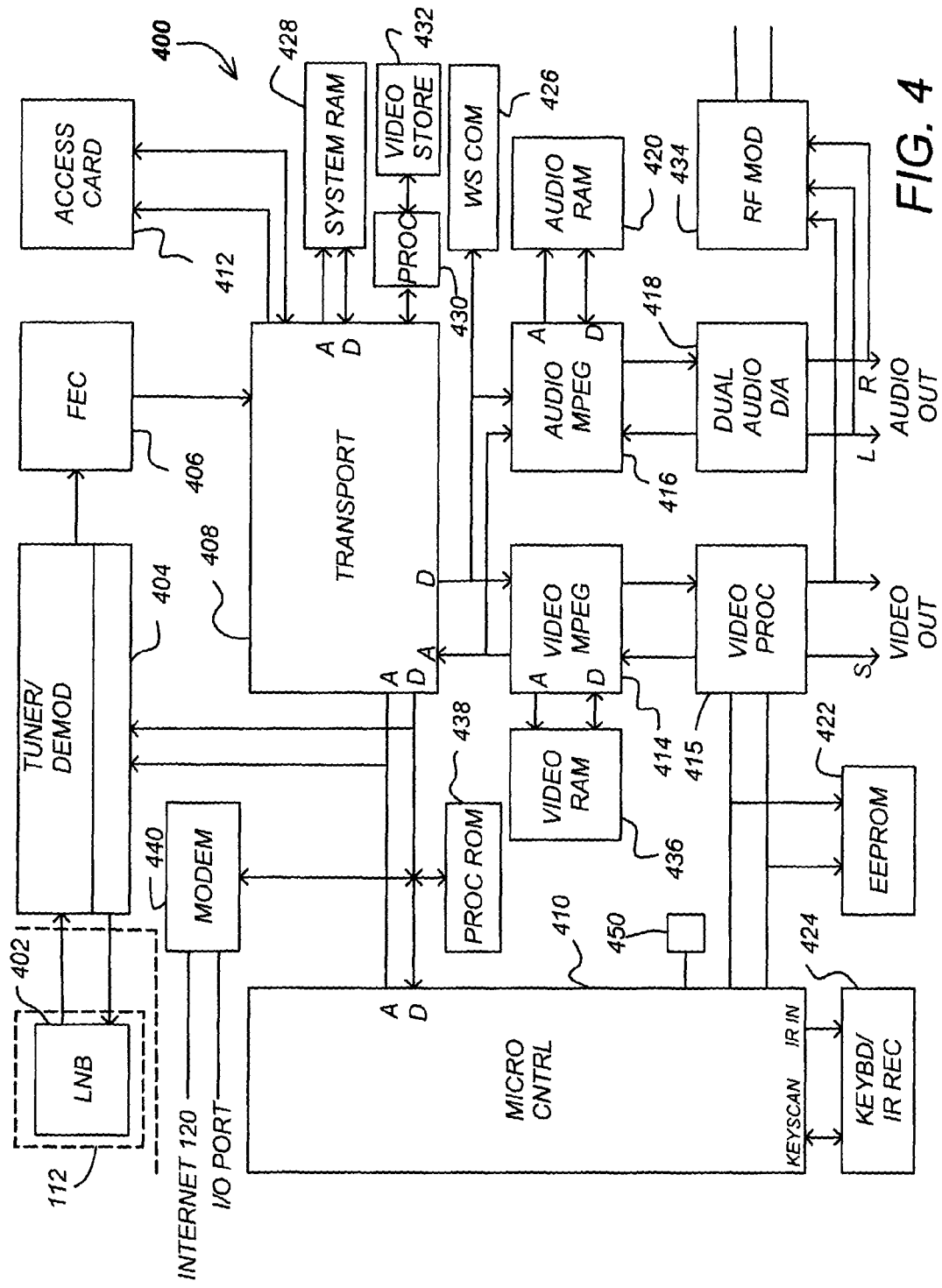
FIG. 4 is a block diagram of one embodiment of a receiver.

FIG. 4 is a block diagram of a set top box (STB) 400 (also alternatively referred to as a receiver 400). As described herein, STB 400 may be an integrated receiver/decoder (IRD). Alternatively, the STB 400 may not be integrated and may comprise a separate or non-integrated receiver and decoder.

The STB 400 comprises an input module such as tuner/demodulator 404 (or other mechanism or module capable of receiving input) communicatively coupled to an ODU 112 having one or more LNBs 402. The LNB 402 converts the broadcast signals (e.g., the 12.2- to 12.7 GHz downlink 118 signal) from the satellites 108 to a signal (e.g., a 950-1450 MHz signal) utilized by the STB's 400 tuner/demodulator 404. The LNB 402 may provide either a dual or a single output. The single-output LNB 402 may have one or more RF connectors, while the dual output LNB 402 may have two RF output connectors and can be used to feed a second tuner 404, a second STB 400 or some other form of distribution system.

The tuner/demodulator 404 isolates a single, digitally modulated 24 MHz transponder, and converts the modulated data to a digital data stream. The digital data stream is then supplied to a forward error correction (FEC) decoder 406. This allows the STB 400 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 406 to the transport module 408 via an 8-bit parallel interface.

The transport module 408 performs many of the data processing functions performed by the STB 400. The transport module 408 processes data received from the FEC decoder module 406 and provides the processed data to the video MPEG decoder 414 and the audio MPEG decoder 416. In one embodiment of the present invention, the transport module, video MPEG decoder and audio MPEG decoder are all implemented on integrated circuits. The transport module 408 also provides a passage for communications between the microcontroller 410 and the video and audio MPEG decoders 414, 416. The transport module also works with the conditional access module (CAM) 412 to determine whether the subscriber receiving station 110 is permitted to access certain program material. Data from the transport module can also be supplied to external communication module 426.

The CAM 412 functions in association with other elements to decode an encrypted signal from the transport module 408. The CAM 412 may also be used for tracking and billing these services. In one embodiment of the present invention, the CAM 412 is a smart card, having contacts cooperatively interacting with contacts in the STB 400 to pass information. Accordingly, purchased programming outside of a subscriber's 122 subscription services and/or e-commerce purchase information may be recorded in one or more slots on the smart card/CAM 412. In order to implement the processing performed in the CAM 412, the STB 400, and specifically the transport module 408 provides a clock signal to the CAM 412.

Video data is processed by the MPEG video decoder 414. Using the video random access memory (RAM) 436, the MPEG video decoder 414 decodes the compressed video data and sends it to an encoder or video processor 415, which converts the digital video information received from the video MPEG module 414 into an output signal usable by a display or other output device. By way of example, processor 415 may comprise an NTSC or an Advanced Television Systems ATSC encoder. In one embodiment of the invention both S-Video and ordinary video (NTSC or ATSC) signals are provided. Other outputs may also be utilized.

Audio data is likewise decoded by the MPEG audio decoder 416. The decoded audio data may then be sent to a digital to analog (D/A) converter 418. In one embodiment of the present invention, the D/A converter 418 is a dual D/A converter, one for the right and left channels. If desired, additional channels can be added for use in surround sound processing or secondary audio programs (SAPs). In one embodiment of the invention, the dual D/A converter 418 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 410 receives and processes command signals from the remote control 424, a STB 400 keyboard interface, and/or another input device. The microcontroller receives commands for performing its operations from a processor programming memory, which permanently stores such instructions for performing such commands. The processor programming memory may comprise a read only memory (ROM) 438, an electrically erasable programmable read only memory (EEPROM) 422 or, similar memory device. The microcontroller 410 also controls the other digital devices of the STB 400 via address and data lines (denoted "A" and "D" respectively, in FIG. 4).

A communication module (such as modem 440, a cable modem, a digital subscriber line (DSL), a data paging circuit, or other mechanism or module capable of communicating or implementing a wired or wireless paging connectivity) may be utilized to connect to the Internet 120 or a data paging network. The communication module 440 calls or establishes communication to the Internet 120 or a data paging network, through an Internet Service Provider (ISP) or data paging network provider and transmits the customer's purchase information for billing purposes, and/or other information. The communication module 440 is controlled by the microprocessor 410. The communication module 440 can output data to other I/O port types including standard parallel and serial computer I/O ports.

The present invention also comprises a local storage unit such as the video storage device 432 for storing video and/or audio data obtained from the transport module 408. Video storage device 432 can be a hard disk drive, a read/writable compact disc of DVD, a solid state RAM, or any other storage medium. In one embodiment of the present invention, the video storage device 432 is a hard disk drive with specialized parallel read/write capability so that data may be read from the video storage device 432 and written to the device 432 at the same time. To accomplish this feat, additional buffer memory accessible by the video storage 432 or its controller may be used. Optionally, a video storage processor 430 can be used to manage the storage and retrieval of the video data from the video storage device 432. The video storage processor 430 may also comprise memory for buffering data passing into and out of the video storage device 432. Alternatively or in combination with the foregoing, a plurality of video storage devices 432 can be used. Also alternatively or in combination with the foregoing, the microcontroller 410 can also perform the operations required to store and or retrieve video and other data in the video storage device 432.

The video processing module 415 output can be directly supplied as a video output to a presentation device such as a video, computer monitor, liquid crystal display (LCD), television, or other device capable of viewing the video output. In addition the video and/or audio outputs can be supplied to an RF modulator 434 to produce an RF output and/or vestigial side band (VSB) suitable as an input signal to a conventional television tuner. This allows the STB 400 to operate with televisions without a video input.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCID.

In accordance with one or more embodiments of the invention, STB 400 leverages the extensive telecommunications infrastructure of established ISPs, the Internet 120, or a data paging network to deliver subscriber 122 e-commerce and IPPV data to a pay-TV service provider such as a DBS operator. Connectivity to the ISP or data paging network may be achieved through a local phone number provided by the ISP or data paging network provider to the pay-TV service provider. In such an embodiment, the pay-TV service provider may deliver the local phone number by broadcasting the number from satellite 108 via link 118 pursuant to a command generated by the conditional access (CA) system/module 412.

The phone number may eventually be received in the STB 400 based on a subscriber's 122 zip code. As described above, the CAM 412 may comprise a smart card with slots for storing information. The smart card or CAM 412 uniquely identifies the STB 400 by an identification number that is stored in a card 412 slot. The smart card 412 identification number, along with the IPPV and e-commerce purchase information, is reported to a pay-TV service provider and differentiates purchases made from specific STBs 400. If several STBs 400 reside within a subscriber's 122 residence, each STB 400 must make a callback to deliver the purchase information for the particular STB 400. The purchases from each of the subscriber's 122 STBs 400 are identifiable by the uniqueness of the smart card 412 identification number reported with the callback.

Purchases are delivered to the billing system from the Internet 120 or data paging network server and thereafter may appear on a subscriber's 122 bill/statement. The purchase information is delivered to the Internet 120 or data paging network server across the Internet 120 or data paging network through a communication module 440 callback executed by STB 400. A processor on the smart card 412 utilizes the communication module 440 to perform the callback using the local phone number. Callback may occur in a variety of manners including: (1) Opportunistic Callback; and/or (2) STB 400 Initiated Callback.

Figure 5:
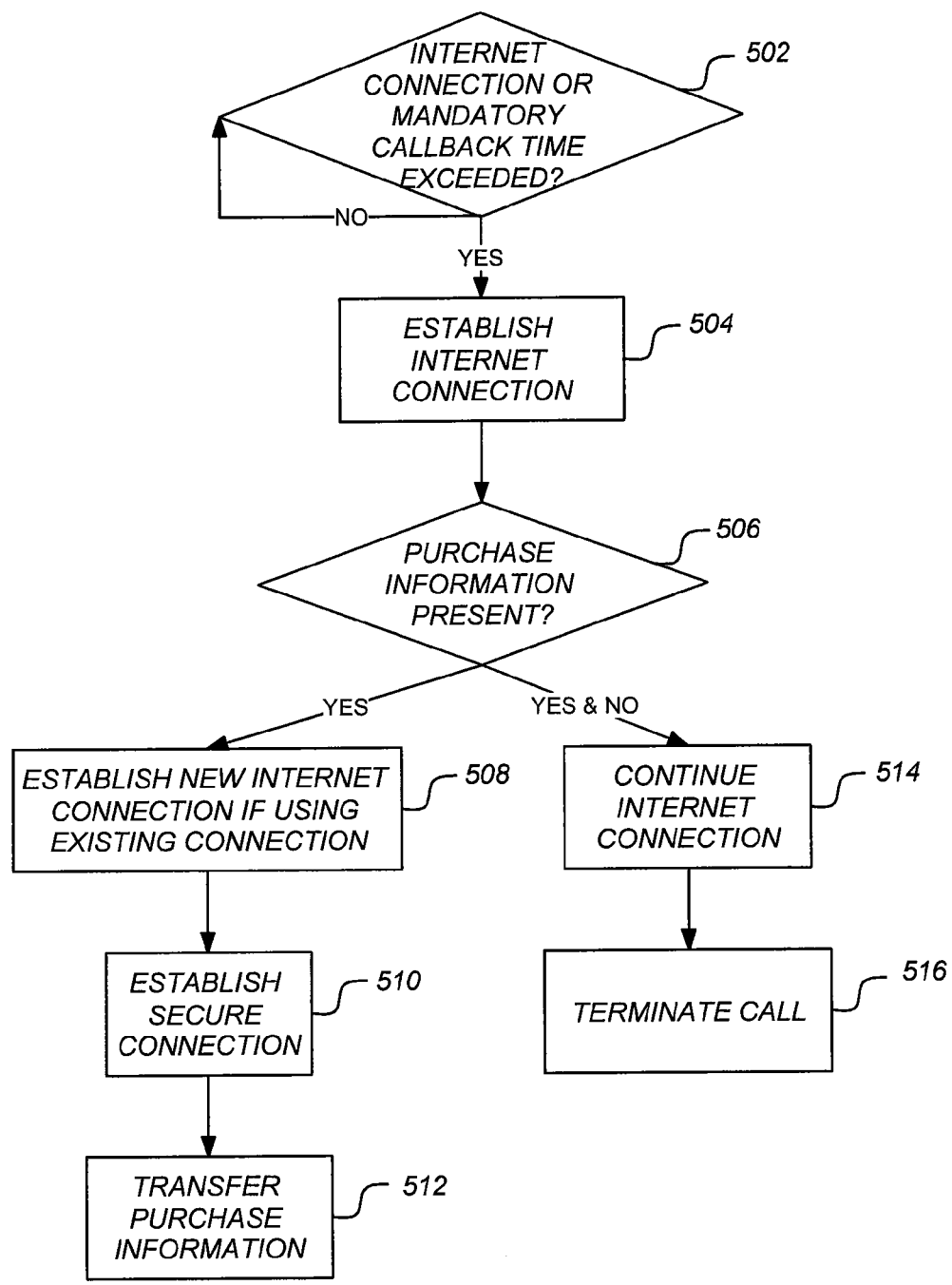
FIG. 5 is a flow chart illustrating an Internet Service Provider callback performed in accordance with one or more embodiments of the invention.

FIG. 5 is a flowchart illustrating callback in accordance with one or more embodiments of the invention. At step 502, a determination is made regarding whether an existing Internet or data paging network connection is present or if a mandatory callback time has been exceeded. In an embodiment implementing an opportunistic callback, STB 400 utilizes an existing Internet 120 or data paging network connection of a subscriber 122. In such an embodiment, the subscriber 122 may access the Internet 120 or data paging network through the STB 400 by initiating an Internet 120 or data paging network connection at step 504. Alternatively, in an STB 400 initiated callback, the STB 400 initiates and utilizes a new Internet 120 or data paging network connection. Such a new connection may be established when a subscriber 122 does not initiate an Internet 120 or data paging network connection within a specified time period (referred to as a mandatory callback time period). Alternatively, with an STB 400 initiated callback, a mandatory callback time period may not be utilized. Instead, for example, an STB 400 may not initiate a callback until a credit limit or slot usage threshold has been exceeded, and/or until information is actually stored in smart cart 412.

The Internet 120 or data paging network connection may be established using the communication module 440 to call a local phone number for an ISP or data paging network provider. As described above, the local phone number may be obtained from the STB 400 (as transmitted from the ISP or data paging network provider to the pay-TV service provider, broadcast, and received in STB 400) based on the zip code of the subscriber 122. Alternatively, any method or type of communication module 440 may be utilized to connect the STB 400 to the Internet 120 or data paging network.

Under either an opportunistic callback or STB 400 initiated callback, a transmission control protocol/internet protocol (TCP/IP) Internet 120 or data paging network connection is established at step 504. With an opportunistic callback, the TCP/IP Internet 120 or data paging network connection is initiated by the subscriber 120 to access the Internet 120 the data paging network. With a STB 400 initiated callback, the TCP/IP Internet 120 or data paging network connection is initiated by the STB 400 to deliver the purchase information.

At step 506, a determination is made as to whether or not purchase information is present in smart card 412. If purchase information is present, a new TCP/IP Internet 120 or data paging network connection (e.g., through the ISP) may be established at step 508 if an existing Internet 120 or data paging network connection is being utilized. This new connection is made in addition to any other connections the subscriber 122 presently has for other Internet 120 or data paging network uses. This additional TCP/IP Internet 120 or data paging network connection likely has no affect on traffic being sent/received by the subscriber 122 other than occupying a small fraction of the bandwidth to send the purchase information and receive renewal notices (e.g., purchase information may only contain tens of bytes per purchased transaction). Accordingly, a subscriber's 122 normal Internet 120 or data paging network connection is utilized and instead of the STB 400 initiating the Internet 120 or data paging network connection, the Internet 120 or data paging network connection is initiated by the subscriber's 122 own action. Further, with an opportunistic callback, the transfer of purchase information (callback) may be triggered through parameters configured within the STB 400 that specify a new TCP/IP Internet 120 or data paging network connection is to be made when the smart card 412 has purchase information and a preexisting Internet 120 or data paging network connection is present.

With a STB 400 initiated callback, step 508 may not be performed since it may have already been performed at step 504 for the explicit use by STB 400 for a callback using the ISP or data paging network provider connection.

At step 510, a secure Internet 120 or data paging network connection (e.g., provided by the secure socket layer (SSL) protocol) is established between the STB 400 and an Internet 120 or data paging network server (e.g., of control center 120 or the pay-TV service provider) to ensure the integrity of the purchase information during transfer. Accordingly, after an Internet 120 or data paging network connection is established, the STB 400 may set up a secure socket to the pay-TV service provider's Internet 120 or data paging network server using the SSL protocol. The data may be encrypted to protect its contents and may be digitally signed to protect its integrity prior to transfer. SSL and a digital signature (that may utilize a proprietary algorithm that is computationally infeasible to break) may be utilized to provide sufficient strength for preventing false reporting or premature call termination. Alternatively, other methods that prevent false reporting or premature call termination may be utilized.

Events not currently stored in smart card 412 (e.g., unreported events) are reported through the system at the next callback opportunity, which may be either opportunistic or STB 400 initiated, for example.

Upon successful reporting of the e-commerce and IPPV events to the pay-TV service provider, the STB 400 (or the conditional access system of the STB 400) may mark the reported slots in the conditional access module (CAM) 412 (e.g., a smart card) as free using the interactive ISP or data paging network provider connection. This allows a subscriber 122 to immediately purchase additional goods from the STB 400, rather than initiating a costly toll free number callback. Operator facility data such as subscriber renewal notices, that are typically broadcast 118 monthly, may also be transmitted over the ISP or data paging network provider connection. Sending renewal notices over an ISP or data paging network provider connection saves satellite 108 bandwidth that may be made available for other broadcast information.

Additionally, upon successfully reporting all events, the conditional access system/module 412 may advance/change the mandatory callback date in the STB 400. Data from the pay-TV service provider can also be sent over the ISP or data paging network connection thereby saving satellite 108 bandwidth.

CONCLUSION

This concludes the description of the preferred embodiments of the present invention. In summary, the present invention describes a method, apparatus, and article of manufacture for delivering purchase information. A callback method, utilizes the telecommunications infrastructure of an ISP or data paging network provider and the Internet 120 or data paging network to deliver purchase information stored in an STB 400 to an Internet 120 or data paging network server. The Internet 120 or data paging network server may then forward the purchase information to the billing system where it may be processed and incorporated into a subscriber's 122 bill.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a set top box configured to receive broadcast content, a callback method comprising:
   determining whether an existing Internet or data paging network connection is coupled to the set top box;
   when the existing Internet or data paging network connection is present, communicating purchase information to a service provider through the existing Internet or data paging network;
   determining whether a subscriber-initiated Internet or data paging network connection has occurred within a mandatory callback time period; and
   when purchasing information has been communicated within the mandatory callback time period, advancing the mandatory callback time period;
   when there is no existing Internet or data paging network connection present or when no subscriber-initiated Internet or data paging network connection has occurred within the mandatory callback time period, initiating a new Internet or data paging network connection;
   in response to the new Internet or data paging network connection, communicating information to the service provider through a new Internet or data paging network connection.

2. The method of claim 1, wherein the purchase information relates to a pay per view program.

3. The method of claim 1, wherein the purchase information relates to an electronic commerce transaction.

4. The method of claim 1, further comprising:
   automatically obtaining a TCP/IP connection through a communication module of the set top box;
   establishing, through the TCP/IP connection, a secure electronic connection with a server of the service provider; and
   communicating the purchase information between the set top box and the server through the secure electronic connection.

5. The method of claim 4, further comprising:
   storing the purchase information in a conditional access module coupled to the set top box; and
   enabling a presentation device to display the broadcast content using the conditional access module.

6. A set top box comprising:
   a memory storing purchase information therein;
   a communication module; and
   a controller in communication with the memory and the communication module, said controller determining whether an existing Internet or data paging network connection is present at the communication module when the existing Internet or data paging network connection is present, said controller communicating purchase information to a service provider through the existing Internet or data paging network connection; said controller detemining whether a subscriber-initiated Internet or data paging network connection has occurred within a mandatory callback time period; when purchase information has been communicated within the mandatory callback time period, said controller advancing the mandatory callback time period, and initiating the communication module to initiate a new Internet or data paging network connection when there is no existing Internet or data paging network connection present or no subscriber-initiated Internet or data paging network connection has occurred within the mandatory callback time period.

7. The set top box of claim 6, wherein the purchase information relates to a pay per view program.

8. The set top box of claim 6, wherein the purchase information relates to an electronic commerce transaction.

9. The set top box of claim 6, wherein the communication module communicates purchase information to a server through the Internet or data paging network connection.

10. The set top box of claim 6, wherein the memory is disposed within a conditional access module.

11. The set top box of claim 10, wherein the purchase information enables a presentation device using the conditional access module.

\* \* \* \* \*